United States Patent
Motoyama (10) Patent No.: US 7,746,366 B2
(45) Date of Patent: Jun. 29, 2010

(54) MULTI-BEAM IMAGE OUTPUT APPARATUS AND METHOD USING A SMALL NUMBER OF PIXEL CLOCK GENERATION UNITS

(75) Inventor: Masanao Motoyama, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 502 days.

(21) Appl. No.: 11/272,707

(22) Filed: Nov. 15, 2005

(65) Prior Publication Data
US 2006/0103712 A1 May 18, 2006

(30) Foreign Application Priority Data
Nov. 17, 2004 (JP) ............................. 2004-333255
Nov. 1, 2005 (JP) ............................. 2005-318744

(51) Int. Cl.
B41J 2/385 (2006.01)
B41J 2/455 (2006.01)
(52) U.S. Cl. ...................................... 347/111; 347/233
(58) Field of Classification Search ................. 347/234, 347/116, 250, 233, 111, 232, 237; 250/236
See application file for complete search history.

(56) References Cited

U.S. PATENT DOCUMENTS

| | | | | |
|---|---|---|---|---|
| 4,596,995 A * | 6/1986 | Yamakawa et al. | .......... | 347/237 |
| 4,950,889 A * | 8/1990 | Budd et al. | ............... | 250/236 |
| 6,160,566 A * | 12/2000 | Maeda | ...................... | 347/234 |
| 6,346,958 B2 * | 2/2002 | Kanno | ...................... | 347/116 |
| 6,466,247 B1 * | 10/2002 | Sugano et al. | ............. | 347/250 |
| 6,493,019 B1 * | 12/2002 | Hirasawa | .................... | 347/233 |
| 7,268,915 B2 * | 9/2007 | Fujino | ....................... | 358/1.9 |
| 2001/0028387 A1 * | 10/2001 | Maeda | ..................... | 347/232 |
| 2006/0001734 A1 | 1/2006 | Akiyama et al. | ........... | 347/249 |

FOREIGN PATENT DOCUMENTS

| | | |
|---|---|---|
| JP | 5-294005 | 11/1993 |
| JP | 5-344292 | 12/1993 |
| JP | 2001013430 | * 1/2001 |
| JP | 2001-264654 | 9/2001 |
| JP | 2005-169870 | 6/2005 |

* cited by examiner

Primary Examiner—Stephen D Meier
Assistant Examiner—Carlos A Martinez, Jr.
(74) Attorney, Agent, or Firm—Fitzpatrick, Cella, Harper & Scinto

(57) ABSTRACT

An image output apparatus which outputs a high quality image by using a small number of pixel clock generation units, for use with a printing engine which has a plurality of laser beam control units. The image output apparatus includes a plurality of output units which output video signals based on print data to the respective laser beam control units in synchronization with a clock signal; and a plurality of clock control units which are arranged in correspondence with respective groups, that are prepared by grouping the plurality of output units, so as to decrease an optical path difference between laser beams controlled by the corresponding laser beam control unit. Each of the clock control units generates the clock signal on the basis of a synchronizing signal generated in the printing engine, and outputs the generated clock signal to output units belonging to a corresponding group.

9 Claims, 8 Drawing Sheets

MULTI-BEAM IMAGE OUTPUT APPARATUS AND METHOD USING A SMALL NUMBER OF PIXEL CLOCK GENERATION UNITS

FIELD OF THE INVENTION

The present invention relates to a multi-beam image output apparatus and method.

BACKGROUND OF THE INVENTION

There has conventionally been known multi-beam printers, which scan a photosensitive drum with a plurality of laser beams, perform an image forming process, and thereby achieve printing by laser printer at both high resolution and high speed.

<Configuration Using Single Pixel Clock Generation Unit for All Laser Beams>

Figure 2:
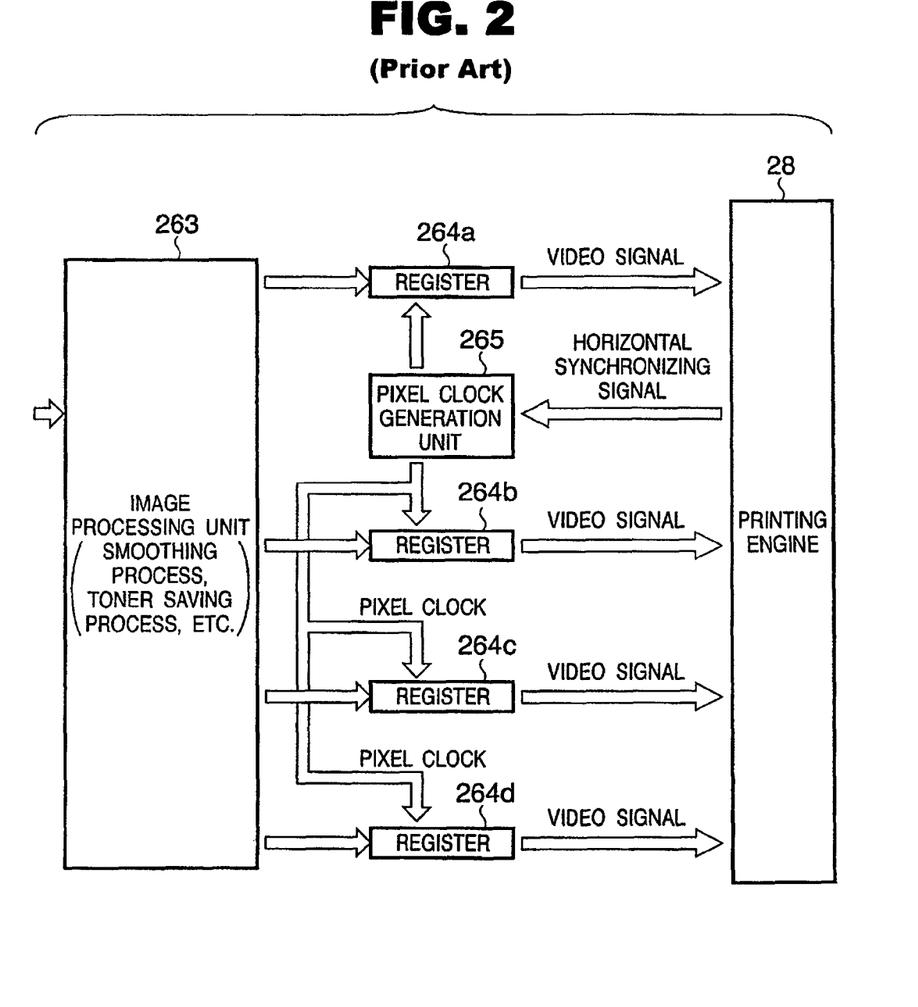
FIG. 2 is a block diagram showing the configuration of an image output apparatus in which all registers operate by a single pixel clock.

A schematic configuration using a single pixel clock generation unit for all laser beams will be explained with reference to FIG. 2. FIG. 2 is a block diagram showing a schematic configuration using a single pixel clock for all registers, which generate a video signal in a multi-beam printer for forming an image with four laser beams.

In FIG. 2, an image processing unit 263 receives print data, internally executes image processes such as a smoothing process and toner saving process, and then outputs the resulting data to registers 264a to 264d. The registers 264a to 264d output print data as video signals to a printing engine 28 in synchronization with a clock output from a pixel clock generation unit 265. The pixel clock generation unit 265 outputs a pixel clock whose phase is synchronized with a horizontal synchronizing signal output from the printing engine 28. The printing engine 28 comprises a plurality of (in this case, four) laser output control units which control laser outputs on the basis of four input video signals.

In the configuration of FIG. 2, all the lasers operate in accordance with pixel clocks of the same frequency, and the multi-beam printer suffices to have, e.g., a minimum number of PLLs (Phase Locked Loops) necessary to generate a pixel clock. Thus, the circuit of an image output unit can be downsized, and the multi-beam printer can be manufactured at low cost.

Figure 7:
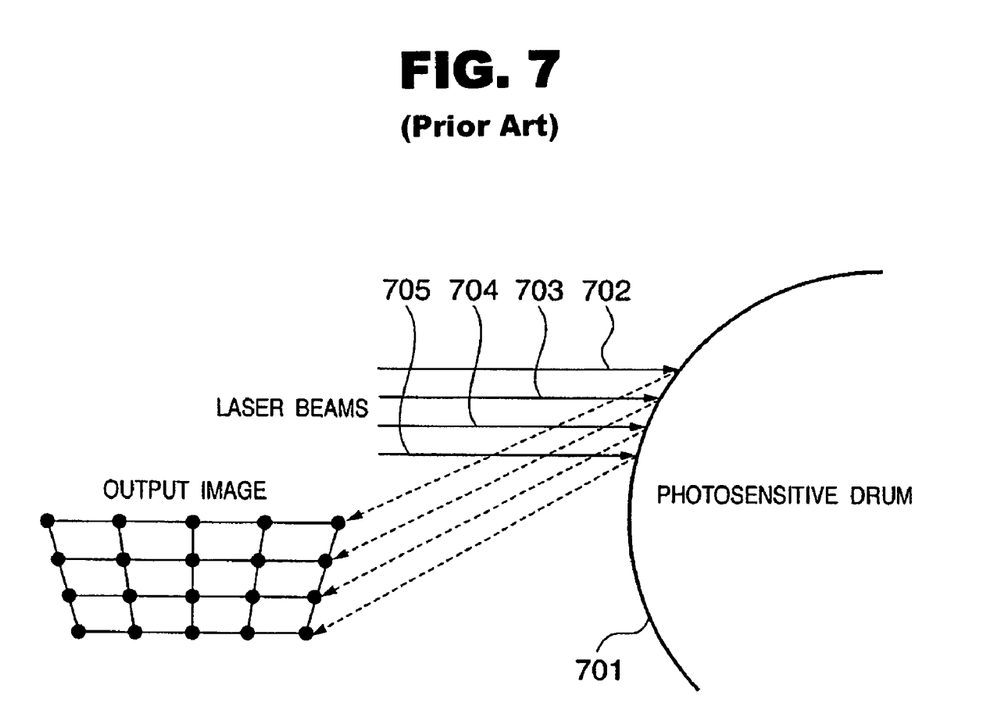
FIG. 7 is a schematic view showing the situation where the scan widths of the laser beams in the main scan direction are inconsistent, due to the difference of the optical path lengths between multi-laser beams in the prior art.

In the multi-beam printer, however, the optical path lengths are different between laser beams, and the scan widths of the laser beams in the main scan direction are inconsistent in the configuration using a single pixel clock generation unit for all laser beams, as shown in FIG. 2. The inconsistency of the scan widths causes a jaggy (jitter) of an image formed with the laser beams. The image quality degrades if the number of laser beams is large and the optical path difference is large. FIG. 7 is a schematic view showing the situation where the scan widths of the laser beams in the main scan direction are inconsistent, due to the difference of the optical path lengths between multi-laser beams in the prior art. 701 is a photosensitive drum, and 702 to 705 are laser beams respectively. In this example, there are 4 laser beams. As shown if FIG. 7, the difference of the optical path lengths on the surface of the photosensitive drum, results in the inconsistency of the scan widths in the main scan direction between laser beams, which causes a jaggy (jitter) of an output image.

<Configuration Using Different Pixel Clock Generation Units for Respective Laser Beams>

Figure 3:
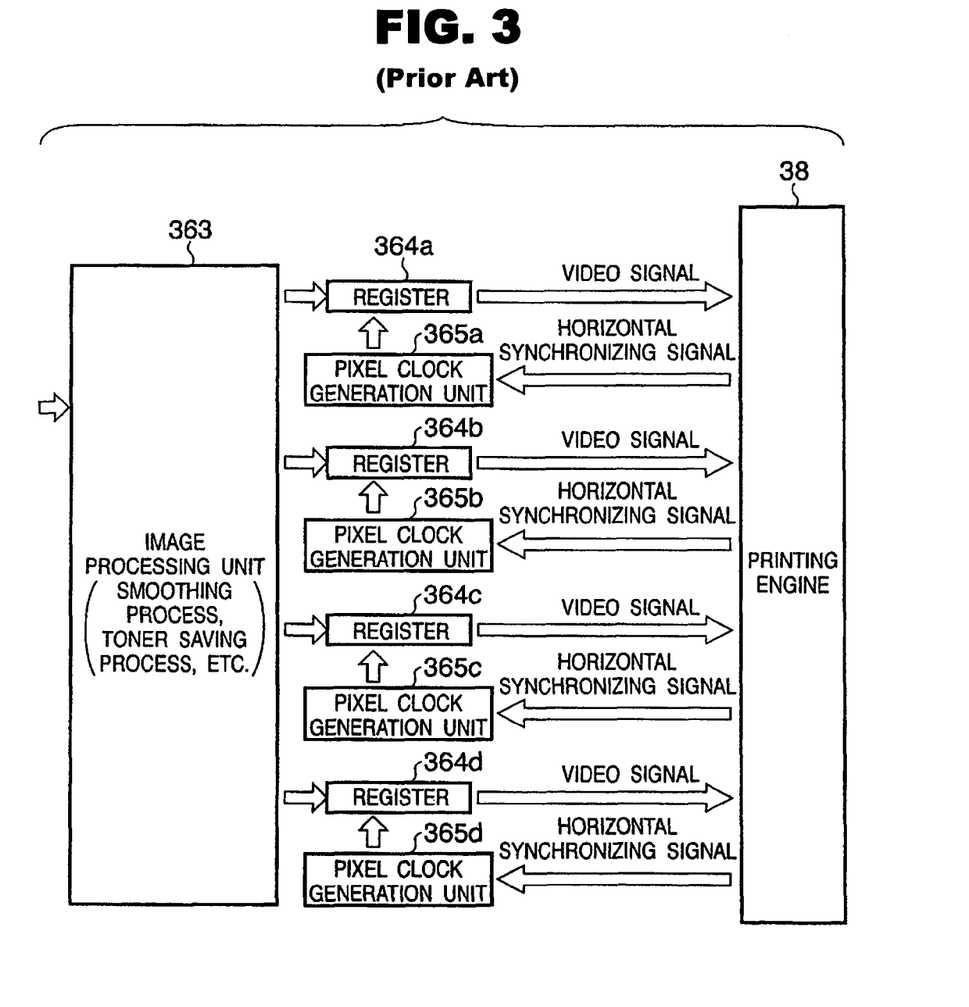
FIG. 3 is a block diagram showing the configuration of an image output apparatus in which all registers operate by individual pixel clocks.

A configuration as shown in FIG. 3 has conventionally been known to solve the problems of the configuration which uses a single pixel clock generation unit for all laser beams, as shown in FIG. 2. FIG. 3 is a block diagram showing a schematic configuration in which individual pixel clock generation units are arranged for each laser beam in a multi-beam printer for forming an image with four laser beams.

In FIG. 3, an image processing unit 363, registers 364a to 364d, and printing engine 38 are the same as the image processing unit 263, registers 264a to 264d, and printing engine 28 in FIG. 2, and a description thereof will be omitted. The operation of pixel clock generation units 365a to 365d is the same as that of the pixel clock generation unit 265 in FIG. 2, and a description thereof will be omitted.

The configuration in FIG. 3 is different from that in FIG. 2 in that the pixel clock generation units 365a to 365d are arranged for the corresponding registers 364a to 364d to perform synchronous control. When individual pixel clock generation units are used for all registers, as shown in FIG. 3, the difference in scan width in the main scan direction between laser beams is corrected by individual pixel clocks even if the number of laser beams is large and the optical path difference between laser beams is large. Accordingly, a high-quality image can be formed.

Prior arts with these configurations have conventionally been known. Japanese Patent Laid-Open No. 2001-264654 discloses a configuration which multiplies a pixel clock to generate pixel clocks for respective laser beams. In this configuration, the scaling factor in the main scan direction is held as data, and the frequency is adjusted by referring to the data.

Japanese Patent Laid-Open No. 5-344292 discloses a configuration which divides a clock higher in speed than a pixel clock by a counter to generate a pixel clock.

Japanese Patent Laid-Open No. 2005-169870 describes that in the multi-beam printer, the scan widths of the laser beams in the main scan direction are inconsistent, due to the difference of the optical path lengths between laser beams. It also discloses a configuration which generates data for adjustment of the scanning start position by laser beams for each laser beam.

Japanese Patent Laid Open No. 5-294005 describes an image forming apparatus which has a laser array where the emission of luminescence part is arranged in the shape of two dimensions. It also discloses that a spot position of the laser is the same position in the main scanning direction, uses the same delay circuit in the image forming apparatus.

In a configuration as shown in FIG. 3, pixel clock generation units must be prepared for respective registers, and circuits such as PLLs must be arranged for all the pixel clock generation units. Thus, the circuit becomes complicated and large, and the whole system becomes expensive.

SUMMARY OF THE INVENTION

The present invention has been made to overcome the conventional drawbacks, and has as its object to provide an image output apparatus which outputs a high-quality image by using a small number of pixel clock generation units.

To achieve the above object, for example, an image output apparatus according to the present invention comprises the following arrangement.

That is, an image output apparatus which is connected to a printing engine, having a plurality of laser beam control units for controlling a plurality of laser outputs on the basis of input video signals comprises a plurality of output units which output video signals based on print data to the respective laser beam control units in synchronization with a clock signal, and a plurality of clock control units which are arranged in correspondence with respective groups, that are prepared by grouping the plurality of output units, so as to decrease an optical path difference between laser beams controlled by the corresponding laser beam control unit, wherein each of the clock control units generates the clock signal on the basis of a synchronizing signal generated in image forming operation of the printing engine, and outputs the generated clock signal to output units belonging to a corresponding group.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail below with reference to the accompanying drawings. Building components described in the embodiments are merely an example, and may not be construed to limit the scope of the present invention.

First Embodiment

Figure 1:
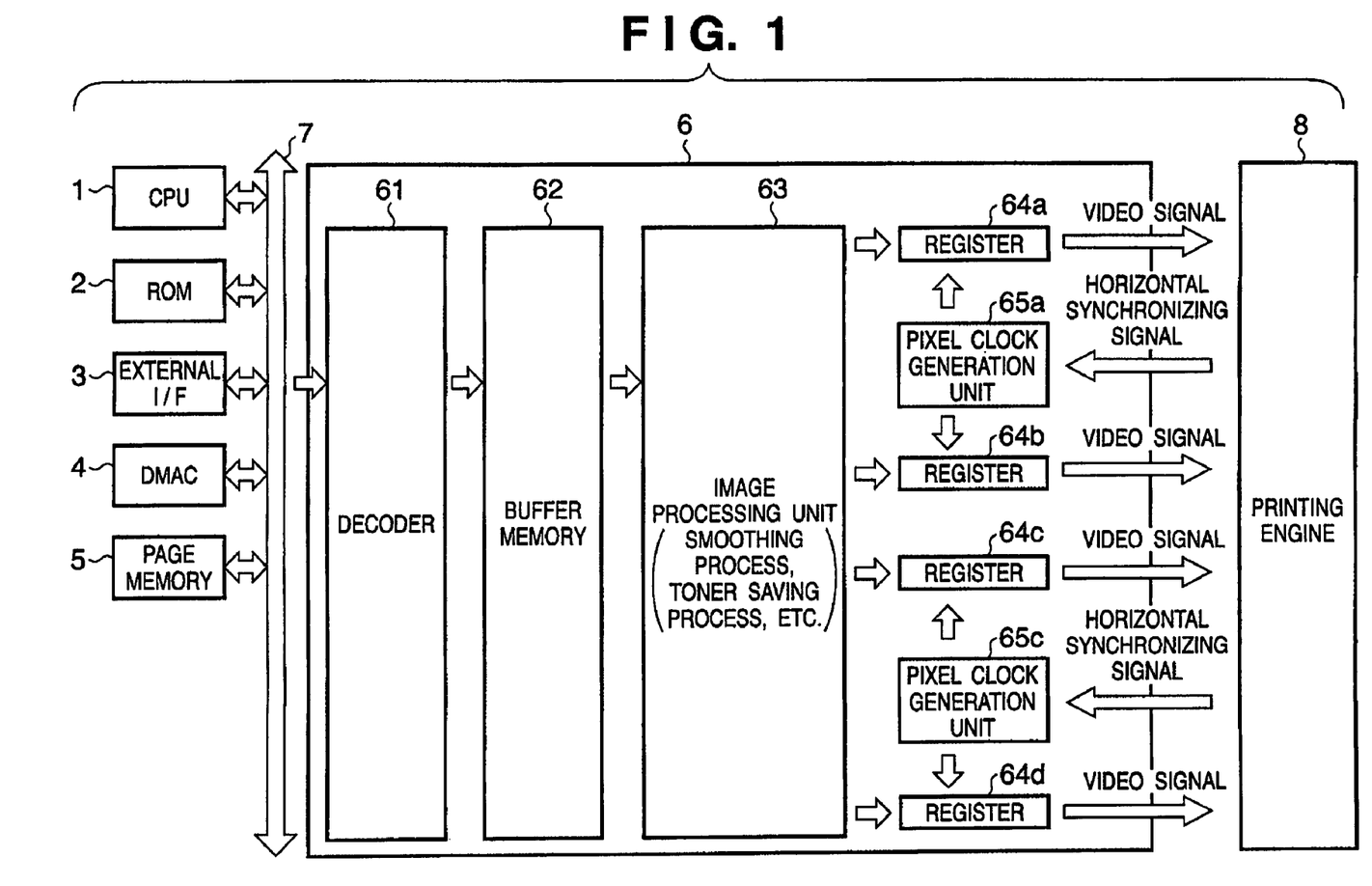
FIG. 1 is a block diagram showing the configuration of an image output apparatus according to the first embodiment.

FIG. 1 is a block diagram showing the configuration of the controller (image output apparatus) of a multi-beam printer according to the first embodiment. As shown in FIG. 1, the controller of the multi-beam printer in the first embodiment comprises a CPU 1, ROM 2, external I/F 3, DMAC (Direct Memory Access Controller) 4, page memory 5, and image output unit 6 which are connected to a system bus 7. The controller is further connected to a printing engine 8.

The CPU 1 executes a program and the like which are stored in the ROM 2 (to be described later). The CPU 1 controls the overall apparatus, and controls a process of generating print data outputtable to the printing engine 8 on the basis of print data received via the external I/F 3 (to be described later).

The ROM 2 is a storage device (memory) which stores a process sequence (program) to be processed by the CPU 1, and various data such as font data and template data used for a document process.

The external I/F 3 is a LAN interface (e.g., Ethernet®), or an I/O interface (e.g., USB, IEEE1284, or IEEE1394), and receives print data from a host apparatus (host computer or the like).

The page memory 5 is a storage device (memory) which temporarily stores the print data generated under the control of the CPU 1. If the page memory 5 stores print data, the print data can also be compressed under the control of the CPU 1 and stored in a compression format in order to save the memory capacity.

The DMAC 4 controls memory access to move data from a given place to another place in the apparatus, independent of CPU 1. Data stored in the page memory 5 is transferred to the image output unit by the DMAC 4.

The image output unit 6 is formed from a decoder 61, buffer memory 62, image processing unit 63, registers 64a to 64d, and pixel clock generation units 65a and 65c. The decoder 61 decodes print data transferred from the page memory 5 under the control of the DMAC 4. The decoded print data is temporarily stored in the buffer memory 62. The print data is output to the image processing unit 63 under the control of the CPU 1.

The image processing unit 63 performs image processes such as a smoothing process and a toner saving process for print data input from the buffer memory 62, divides the print data for respective lines or beams, and outputs the divided data to the registers 64a to 64d. The registers 64a to 64d output print data as video signals to the printing engine 8 in synchronization with clocks output from the pixel clock generation units 65a and 65c. Each register 64a to 64d has a capacity of one line.

Figure 6:
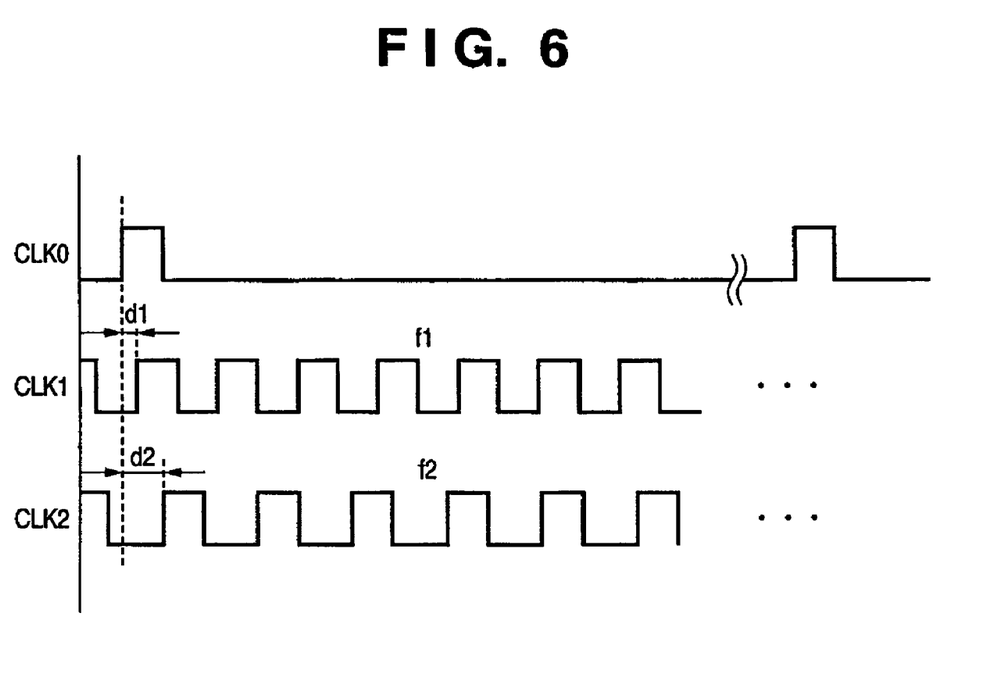
FIG. 6 is a timing chart schematically showing the relationship between a horizontal synchronizing signal and a pixel clock.

The pixel clock generation units 65a and 65c generate pixel clocks whose phases are synchronized with a horizontal synchronizing signal output from the printing engine 8. The pixel clock generation unit 65a outputs a pixel clock to the registers 64a and 64b, whereas the pixel clock generation unit 65c outputs a pixel clock to the registers 64c and 64d. FIG. 6 schematically shows the relationship among a horizontal synchronizing signal CLK0 output from the printing engine 8, a pixel clock CLK1 output from the pixel clock generation unit 65a, and a pixel clock CLK2 output from the pixel clock generation unit 65c. FIG. 6 represents that CLK1 and CLK2 have phase deviations d1 and d2 from the reference clock CLK0, and the frequencies of CLK1 and CLK2 are given by signals f1 and f2. These phase deviation amounts and frequency values are determined on the basis of the timing difference of image forming that is generated by the optical path difference between laser beams and the like. The pixel clock generation unit is formed from circuits such as a PLL (Phase Locked Loop).

The printing engine 8 comprises a plurality of (in the first embodiment case, four) laser output control units (not shown) which control laser outputs on the basis of input video signals (in the first embodiment, four video signals output from the registers 64a to 64d) and perform an image forming process.

In the first embodiment, the same pixel clock is used for a pair of the first and second lines or a pair of the third and four lines which are small in the optical path difference between laser beams and the scan width difference in the main scan direction. This is because the quality of an image formed by a laser beam can be kept high even if the phase deviations and frequencies of pixel clocks for laser beams whose optical path difference and the like are small are set equally. With the configuration of the first embodiment, an image output apparatus capable of obtaining a high-quality image with a smaller number of pixel clock generation units can be implemented.

Figure 8:
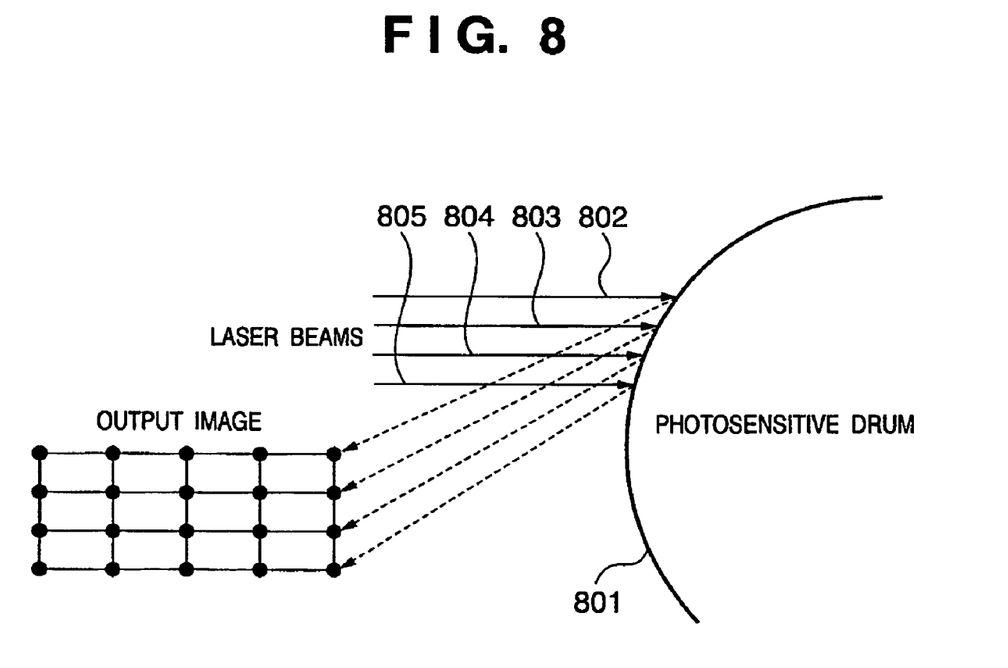
FIG. 8 is a schematic view showing the situation where the inconsistency of the scan widths in the main scan direction, due to the difference of the optical path lengths between laser beams, is corrected by grouping the pixel clocks in the configuration according to the first embodiment.

FIG. 8 is a schematic view showing the situation where the inconsistency of the scan widths in the main scan direction, due to the difference of the optical path lengths between laser beams, is corrected by grouping the pixel clocks in the configuration according to the first embodiment. 801 is a photosensitive drum, and 802 to 805 are laser beams respectively. In this example, there are 4 laser beams.

In usual implementation of the apparatus, the difference of the optical path lengths between adjacent laser beams is small, and the difference of the scan widths in the main scan direction due to the difference of the optical path lengths is small. Thus, even if the same pixel clock is used for adjacent laser beams, a visual jaggy (jitter) of an output image does not occur. Between laser beams kept apart (e.g., 802 and 805), however, the difference of the optical path lengths is large, and the difference of the scan widths in the main scan direction due to the difference of the optical path lengths is not small, which causes a visual jaggy (jitter) of an output image. In this embodiment, because the same pixel clock is used for the laser beams, which are small e.g., in the optical path difference, the quality of the image can be kept high and the circuit can be downsized.

The first embodiment has described a configuration in which a pixel clock supplied from a single pixel clock generation unit is used for registers corresponding to adjacent lines. However, the present invention is not limited to this, and a group of registers which use the same pixel clock may be arbitrarily set as far as, for example, the optical path difference between laser beams which form lines of an image is small.

Second Embodiment

The first embodiment has described a case wherein, for example, the optical path difference between laser beams that form lines of an image is small. However, embodiments according to the present invention are not limited to this. The present invention also incorporates a case wherein a plurality of laser beams having a small difference in image forming timing are generated by the same pixel clock generation unit.

Figure 4:
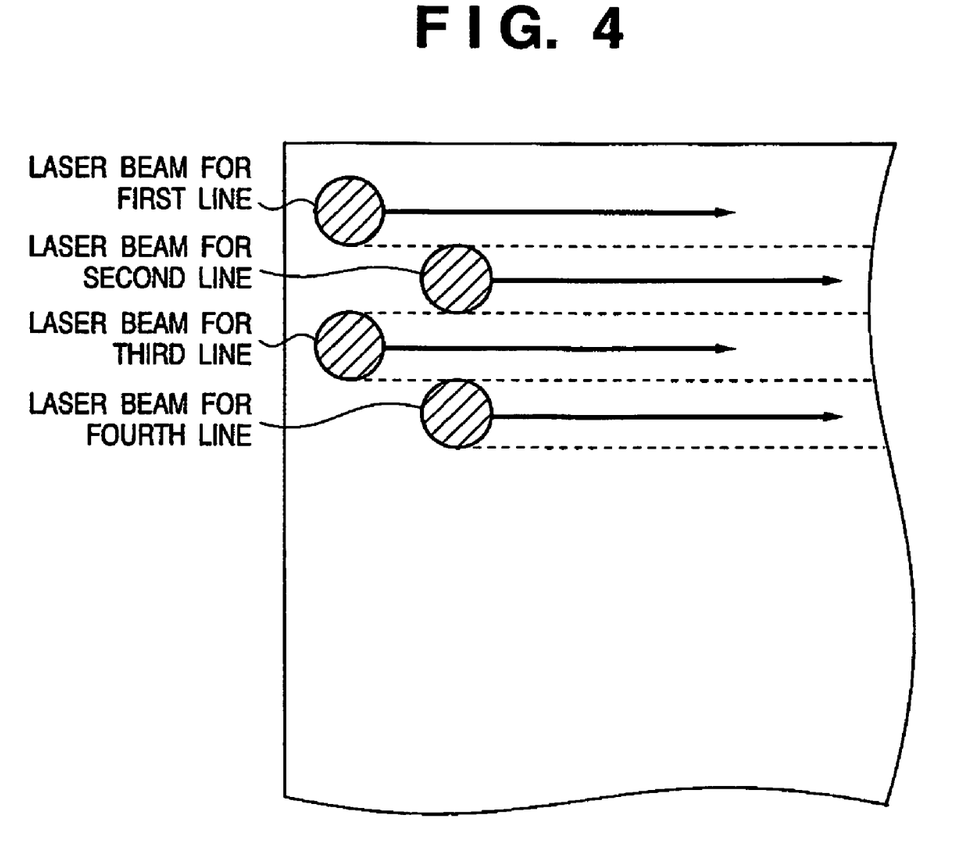
FIG. 4 is a schematic view showing the timing of laser beam drawing by a printer which forms an image with four beams.

The second embodiment will explain a case wherein the image forming timings of the first and third lines are almost the same, and those of the second and fourth lines are almost the same, as shown in FIG. 4. In this case, for example, if the first and second lines are operated by the same pixel clock, their image forming start positions are inconsistent, failing to obtain any high-quality image.

Figure 5:
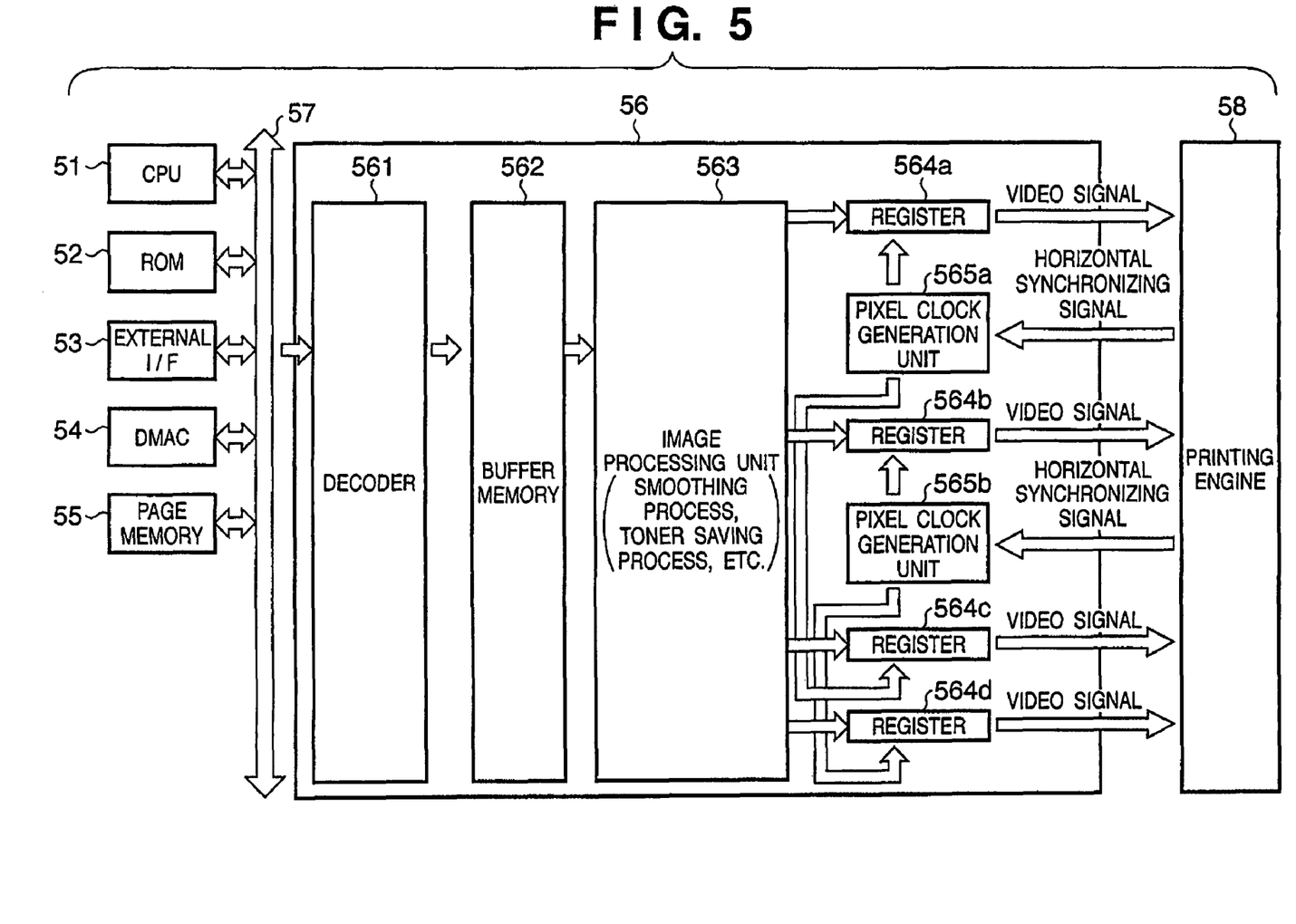
FIG. 5 is a block diagram showing the configuration of an image output apparatus according to the second embodiment.

To avoid this, according to the second embodiment, as shown in FIG. 5, registers 564a and 564c for forming the first and third lines of an image are operated by a pixel clock generated by a pixel clock generation unit 565a while registers 564b and 564d for the second and fourth lines are operated by a pixel clock generated by a pixel clock generation unit 565b.

A CPU 51, ROM 52, external I/F 53, DMAC 54, page memory 55, and printing engine 58 are the same as the CPU 1, ROM 2, external I/F 3, DMAC 4, page memory 5, and printing engine 8 in FIG. 1, and a description thereof will be omitted. A decoder 561, buffer memory 562, image processing unit 563, and registers 564a to 564d in an image output unit 56 are the same as the decoder 61, buffer memory 62, image processing unit 63, and registers 64a to 64d in FIG. 1, and a description thereof will be omitted. Pixel clock generation units 565a and 565b are also the same as the pixel clock generation units 65a and 65c in FIG. 1.

With this configuration, similar to the first embodiment, the second embodiment can implement an image output apparatus capable of obtaining a high-quality image with a smaller number of pixel clock generation units even when pixel clocks necessary to form an image are different between adjacent lines such as the first and second lines or the third and fourth lines.

Note that a group of laser beams which are generated by the same pixel clock generation unit may be arbitrarily determined.

Third Embodiment

The first and second embodiments have described a configuration using four laser beams, but the present invention is not limited to this. The embodiment can also be applied to a configuration using a predetermined number of laser beams.

The number of registers for which one pixel clock generation unit outputs a pixel clock can take a desired value for each pixel clock generation unit.

As has been described above, the present invention can provide an image output apparatus which outputs a high-quality image by using a small number of pixel clock generation units.

As many apparently widely different embodiments of the present invention can be made without departing from the spirit and scope thereof, it is to be understood that the invention is not limited to the specific embodiments thereof except as defined in the claims.

What is claimed is:

1. An image output apparatus which is connected to a printing engine, wherein the printing engine includes a plurality of laser beam control units for controlling a plurality of laser outputs to a single photosensitive drum on the basis of input video signals, said image output apparatus comprising:
a plurality of output units which output video signals based on print data to the respective laser beam control units for the single photosensitive drum in synchronization with a clock signal; and
a plurality of clock control units which are arranged in correspondence with respective groups of plural ones of said output units, wherein each group is prepared by grouping plural ones of said plurality of output units so as to decrease a difference in optical paths to the single photosensitive drum between laser beams controlled by the corresponding laser beam control unit,
wherein optical path lengths of the laser beams are inconsistent in a direction orthogonal to a main scan direction for the single photosensitive drum,
wherein the difference in the optical paths is caused at least in part by the fact that the single photosensitive drum is cylindrical, and at least in part by the fact that the optical path lengths of the laser beams are inconsistent in the direction orthogonal to the main scan direction for the single photosensitive drum, and
wherein each of said clock control units generates the clock signal on the basis of a synchronizing signal generated in an image forming operation of the printing engine, and outputs the generated clock signal to all output units belonging to a corresponding group.

2. The apparatus according to claim 1, in that the grouping of the plurality of output units so as to decrease an optical path difference between laser beams controlled by the corresponding laser beam control unit, refers to grouping so as to form a group from output units having adjacent drawing areas of laser beams controlled by the corresponding laser beam control unit.

3. The apparatus according to claim 1, in that the grouping of the plurality of output units so as to decrease an optical path difference between laser beams controlled by the corresponding laser beam control unit, refers to grouping so as to decrease a difference in scan width of a main scan direction between laser beams.

4. The apparatus according to claim 1, in that said clock control unit includes a PLL.

5. The image output apparatus according to claim 1, wherein there are at least two groups for the single photosensitive drum, with at least two output units in each group.

6. A control method for controlling an image output apparatus which is connected to a printing engine, wherein the printing engine includes a plurality of laser beam control units for controlling a plurality of laser outputs to a single photosensitive drum on the basis of input video signals, and wherein the image output apparatus includes a plurality of output units which output video signals based on print data to the respective laser beam control units for the single photosensitive drum in synchronization with a clock signal, the method comprising:

a generation step of generating a clock signal for each of groups of plural ones of the output units, wherein the clock signal is generated on the basis of a synchronizing signal generated in an image forming operation of the printing engine; and an output step of outputting the generated clock signal for the corresponding group to output units belonging to said corresponding group, wherein each group is formed by grouping plural ones of said plurality of output units based on a difference in optical paths to the single photosensitive drum between laser beams controlled by the corresponding laser beam control units, wherein optical path lengths of the laser beams are inconsistent in a direction orthogonal to a main scan direction for the single photosensitive drum, and wherein the difference in the optical paths is caused at least in part by the fact that the single photosensitive drum is cylindrical, and at least in part by the fact that the optical path lengths of the laser beams are inconsistent in the direction orthogonal to the main scan direction for the single photosensitive drum.

7. The control method according to claim 6, wherein the groups are formed by grouping the output units having adjacent drawing areas of laser beams controlled by the corresponding laser beam control unit.

8. The control method according to claim 6, wherein the groups are formed by grouping the output units so as to decrease a difference in scan width of a main scan direction between laser beams.

9. The control method according to claim 6, wherein there are at least two groups for the single photosensitive drum, with at least two output units in each group.

* * * * *